United States Patent
Tocha

[11] Patent Number: 6,079,446
[45] Date of Patent: Jun. 27, 2000

[54] COUPLING FOR CONNECTING VACUUM-INSULATED LINE ENDS

[75] Inventor: Klaus Tocha, Langenfeld, Germany

[73] Assignee: Messer Griesheim GmbH & Co., Germany

[21] Appl. No.: 09/215,588

[22] Filed: Dec. 17, 1998

[51] Int. Cl.⁷ .................................................. F16L 29/00
[52] U.S. Cl. ........................ 137/614.06; 137/614.03; 251/63.5; 62/50.7
[58] Field of Search ................ 137/614.06, 614.04, 137/614, 614.05, 614.03; 251/12, 62, 63, 63.5, 63.6; 62/50.7

[56] References Cited

U.S. PATENT DOCUMENTS

| | | |
|---|---|---|
| 3,573,863 | 4/1971 | Doors et al. ............................ 137/375 |
| 3,842,614 | 10/1974 | Karcher et al. ................. 137/614.04 X |
| 5,251,668 | 10/1993 | Walther ............................... 137/614.06 |
| 5,806,564 | 9/1998 | Wilcox ................................. 137/614.05 |

*Primary Examiner*—Kevin Lee
*Attorney, Agent, or Firm*—Conolly Bove Lodge & Hutz LLP

[57] ABSTRACT

The invention relates to a coupling for connecting vacuum-insulated line ends via a coupling socket and a coupling plug which are provided for conveying a cryogenic medium and which have closing elements at the outer line ends that close the line ends. So that the valve-like means can be opened or closed by remote control in a defined manner, the coupling plug (10) has a control unit (43) that is connected to the closing element (29) and that opens at least the closing element (29) when exposed to control pressure.

17 Claims, 2 Drawing Sheets

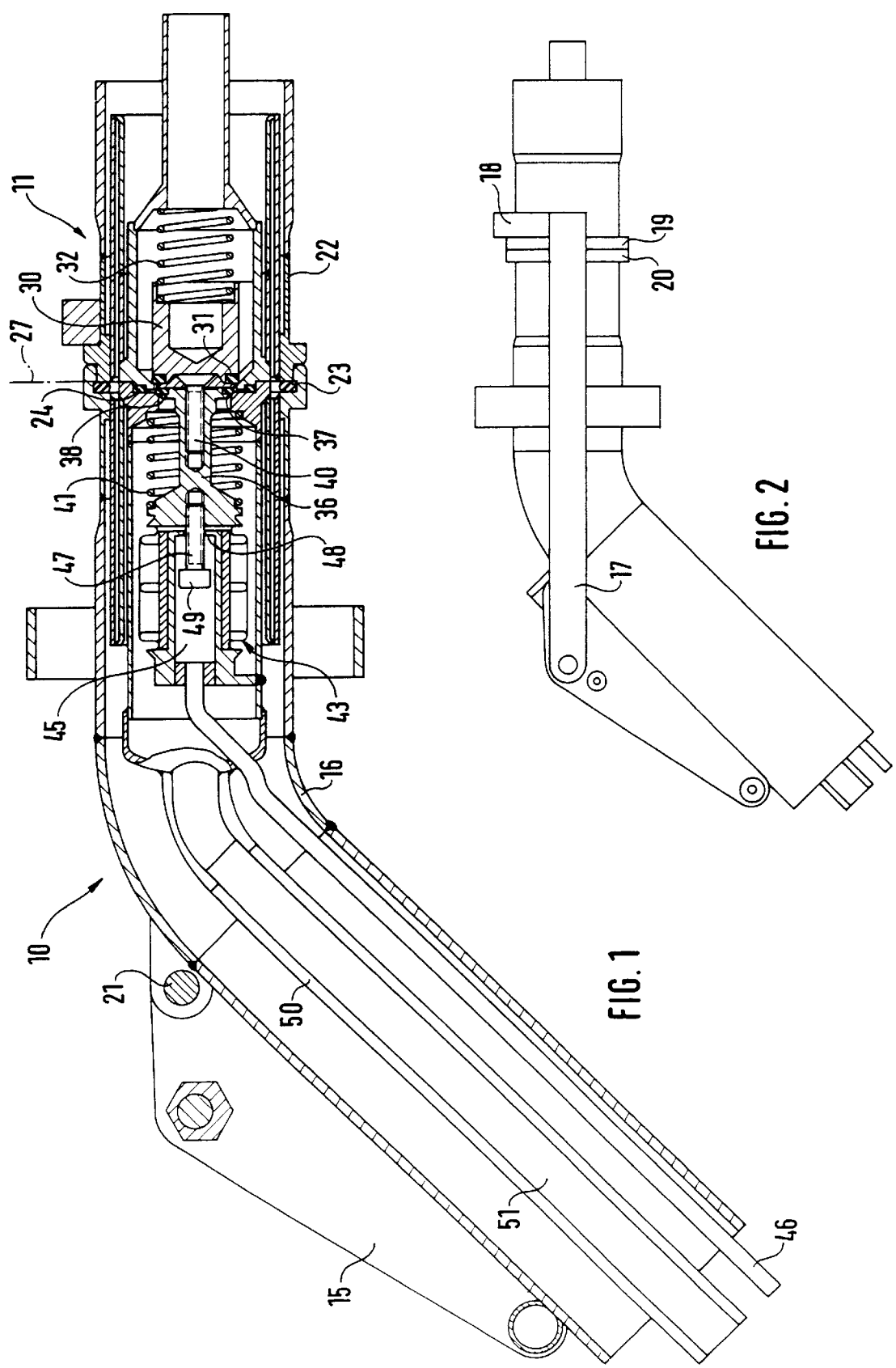

COUPLING FOR CONNECTING VACUUM-INSULATED LINE ENDS

BACKGROUND OF THE INVENTION

This application is related to DE 197 27 655.5 filed on Jun. 30, 1997, which is incorporated by reference in its entirety for all purposes.

The invention relates to a coupling for connecting vacuum-insulated line ends via a coupling socket and a coupling plug which are provided for conveying a cryogenic medium and which have means at the outer line ends that close the line ends.

Couplings for cryogenic media are already known which can be divided into two groups on the basis of their connection mechanism and their means for opening and closing the line ends.

DE 19516029 C1, DE 4041337 A1 and DE 4339676 A1 disclose couplings for cryogenic media which have a coupling plug and a coupling socket. The coupling plug is inserted into the coupling socket so that the outer vacuum-insulated outer coupling housings overlap and a connection element arranged on the outside of the coupling housing can be engaged with a counterpart arranged on the coupling plug. The connection is established by screwing the coupling plug to the coupling socket. During the performed process of sliding the coupling plug into the coupling socket, the coupling is first sealed off against the ambient medium; then the means that close the line ends are opened. The valve-like means in this embodiment of the coupling are located far away from the separation plane inside the coupling socket in the coupling plane.

In the separation plane, the outer faces of the coupling plug and the coupling socket are directly across from each other.

In the coupling plane, the means that close the line ends are directly across from each other. The means can be opened or closed and, when the means are opened, cryogenic medium can flow from the line end of the coupling plug to the line end of the coupling socket.

Moreover, DE 4104711 A1 and U.S. Pat. No. 4,335,747 A1 disclose the technique of sealing against ambient medium separately from the opening/closing of the means directly adjacent to the separation plane by means of ball valves. The connection of the coupling plug with the coupling socket is established with mechanical elements in the separation plane. Likewise far away from the separation plane, in the coupling socket, these couplings have valve-like means whose opening is effectuated by means of the line end of the coupling plug that can be mechanically slid beyond the separation plane and through the opened ball valves all the way to the coupling plane. For this purpose, the line end of the coupling plug is configured to be flexible like a corrugated hose.

From a mechanical and safety-related standpoint, the interlocking screwed connections of the known couplings for opening the valve-like means are not a feasible solution since, for example, a great deal of mechanical and electrical effort is needed with the automatic rotation of the union nut proposed in DE 40 41 337 A1 and this leads to a set-up that can no longer be handled by non-technical personnel in terms of the size and the weight of the coupling. In contrast, the solution proposed in DE 41 04 711 A1, namely, to slide the line end by turning a setscrew until the valve-like means opens, leads to a complicated mechanical construction of the means and of the line end ensuring the seal between the coupling plug and the coupling socket. However, the instructions disclosed in DE 195 16 029 C1, i.e., to exert the force by means of a lever, a cam or a cylinder powered by an outside medium during the plugging and connecting of the coupling plug with the coupling socket, only follows the path indicated by the known state of the art described above, namely, to connect the coupling housings to each other by means of a relative movement. Here, the valve-like means are located far away from the separation plane inside the coupling socket. The plug-in/push-in connection is unsatisfactory from a safety standpoint when the coupling socket is located as a refueling device (tank closure) on a vehicle and the coupling plug is located on a pump of a service station, since the plug-in connection can cause serious damage to the service station and/or the vehicle if the vehicle drives away while it is still connected, even if the coupling plug is separated form the coupling socket in the separation plane and the coupling plug to the coupling socket is located in the coupling plane. In addition, during the refueling of cryofuel tanks of vehicles, lay persons operate the coupling, which calls for a simple and safe design of the coupling so that the users do not come into contact with the cryogenic fuel.

Therefore, couplings for cryogenic media would be desirable in which the disadvantages according to the state of the art are avoided.

SUMMARY OF THE INVENTION

The invention is based on the objective of creating a coupling for cryogenic media with which the valve-like means can be opened or closed by remote control in a defined manner and whereby the operational safety as well as operating errors are improved in comparison to the prior art couplings.

This objective is achieved according to the invention by a coupling of the type described above having the features of claim 1.

Advantageous embodiments of the invention are described in the dependent claims.

Due to the remote-controlled activation of the coupling according to the invention, the flow path of the cryogenic medium is released directly, independent of the plug-in/push-in paths. The detachable and, in case of emergency, releasable connection of the coupling plug and coupling socket is carried out previously in a separate step. This ensures that the operator of the coupling does not come into contact with the cryogenic medium since he/she only has to establish the connection of the coupling plug and coupling socket at the coupling, and the opening of the means takes place away from the coupling via an operating element. The opening of the means can also be carried out automatically at a prescribed time, e.g. by inserting coins or tokens or by using a credit or debit card.

The control effort is simplified when the means that close the two line ends open in the same direction so that the control unit that is under a control pressure, preferably a control gas, slides a control element beyond the separation plane, thus opening the two valve-like means. Here, the control element provided for the coupling plug is configured as a control rod having a gasket that is pulled by means of the force of a spring element of the bellows against a sealing surface formed at the line end, while the gasket of the coupling socket supported by a closing element is pressed by the force of a spring element or bellows against the sealing surface present on the line end. If the control rod slides axially to the coupling socket due to the extending control unit, the gasket lifts the control rod off of the sealing surface;

at the same time, the control rod removes the closing element from the seat against the force of the spring element or the spring properties of the bellows, so that the gasket on the closing element is likewise lifted off of the sealing surface and the cryogenic medium can flow from the coupling plug to the coupling socket.

An especially simple control unit has bellows, preferably metal bellows, whose inner chamber is connected to a control line whose other end is connected to a compressed gas chamber. The control line contains a remote-controlled valve that can be opened or closed via a control signal or closed with the simultaneous pressure-relief of the bellows. Of course, the control unit can also be configured as a piston-cylinder unit.

The dimensions of the coupling can be reduced and the mechanical structure can be greatly simplified if the control unit is located in the line end, since passages and connections are dispensed with and the means can be connected directly to the control unit.

The virtually straight-line sliding of the control rod and of the closing element is achieved by a centering element that is attached to the face of the control rod and that engages with a counterpart situated on the closing element of the coupling socket so as to hold the centering element in an interlocking manner. The interlocking connection ensures the axial guidance of the control rod which is centered in the guided closing element of the coupling socket.

The coupling can be cooled down when the means are closed by means of two lines that are connected to the line end. In this process, the line with the smaller diameter serves as the filling line through which the cryogenic medium flows into the line end and pre-cools the line end. The evaporated medium flows through the line with the larger diameter. When the coupling is in operation, the cryogenic medium flows through both lines so as to be able to achieve the largest possible mass flows and thus a shortening of the filling time with little pressure loss.

The connection of the line ends of the coupling plug and coupling socket is established directly adjacent to the separation plane, since all of the means for closing the two line ends are provided directly adjacent to the separation plane, so that the separation plane and the coupling plane lie virtually in the same plane. This facilitates the handling of the coupling since plug-in/push-in processes of the stainless-steel coupling housings are eliminated. The safety is increased since, in case of error, no interlocking connection holds the coupling plug in the coupling socket. In addition, all of the gaskets are located detachably directly adjacent to the separation plane and are thus readily accessible. Therefore, the replacement of defective gaskets can be done in a simple manner.

The sealing of the coupling plug and the coupling socket in the separation plane preferably takes place via two coupling surfaces on each of which there is a gasket. The one outer gasket seals the coupling housing against the penetration of ambient medium and prevents ice formation, whereas the inner gasket seals the means so as to prevent the escape of cryogenic medium. Thanks to the gaskets that form a sealed annular chamber when they are in the coupled state, a link between the warm ambient medium with the cryogenic medium is prevented.

The connection of the coupling plug with the coupling socket is established via a locking element that is supported on the coupling plug (fixed bearing) and that pulls the coupling socket against the coupling surfaces with the gaskets. For this purpose, the coupling socket has a flange along its circumference behind which a half-shell element of the locking element grasps and which is pulled to the coupling plug side by means of a rod assembly. In this process, the gaskets tightly seal the coupling surfaces of the coupling plug and the coupling socket. The flow pressure that is established in the line end when the means are open also brings about pressure-proportional sealing forces on the gasket on the side of the coupling plug. Advantageously, the locking element is configured in such a way that it can immediately be detached by an emergency release, preferably after the internal closing process, so that the coupling plug and the coupling socket are immediately freely movable. An embodiment of the emergency release can consist of a rip cord that opens the switch-over lever of the locking element and releases the rod assembly with the half-shell element when a specified tensile force on the coupling is exceeded. Naturally, there are numerous other mechanical, pneumatic, hydraulic electric or magnetic embodiment variants of an emergency release that the person skilled in the art can provide, so that the invention is not limited to this embodiment.

Preferably the coupling plug is part of a service station pump and the coupling socket is provided as a tank closure in a vehicle that is refueled with a cryofuel.

An embodiment of the invention is shown in the drawing and will be described in greater detail below.

BRIEF DESCRIPTION OF THE DRAWINGS

The following is shown:

FIG. 1 a longitudinal section of a coupling in which the two line ends of the coupling plug and of the coupling socket are closed;

FIG. 2 a schematic representation of the coupling housing coupled together with the locking element;

DETAILED DESCRIPTION OF THE PREFERRED EMBODIMENT

Figure 3A:
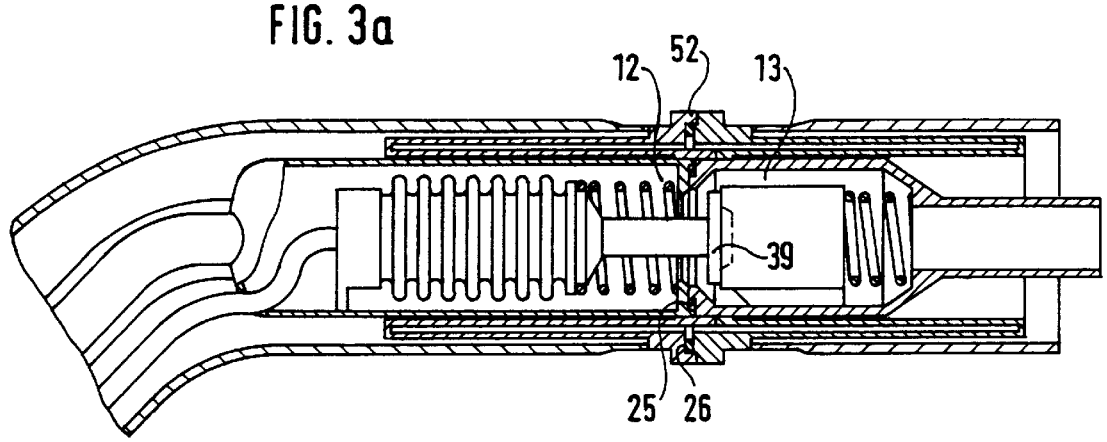
FIG. 3a a schematic longitudinal section of the coupling shown in FIG. 1 with an open flow path.

The coupling according to FIG. 1 shown in a longitudinal section comprises a coupling plug 10 and a coupling socket 11 for connecting two line ends 12, 13 (FIG. 3a). The connection of the coupling plug 10 with the coupling socket 11 is made by the locking element. For this purpose, on the vacuum-insulated coupling housing 16 of the coupling plug 10, there is a switch-over lever 15 which is supported so that it can rotate around an axis 21 and on which a rod assembly 17 is supported outside of the rotating axis 21 so as to pivot. A half-shell element 18 is attached to the rod assembly and said half-shell element 18 grasps around a flange 19 of the vacuum-insulated coupling housing 22 of the coupling socket 11 and, when the switch-over lever 15 rotates around the axis 21, pulls the flange 19 against a flange 20 of the coupling plug. Via the movement of the element 18, the necessary mechanical force is generated to pull the vacuum housing 22 of the coupling socket 11 against the coupling surfaces 25, 26 (having the gaskets 23, 24) of the coupling plug 10.

Figure 3B:
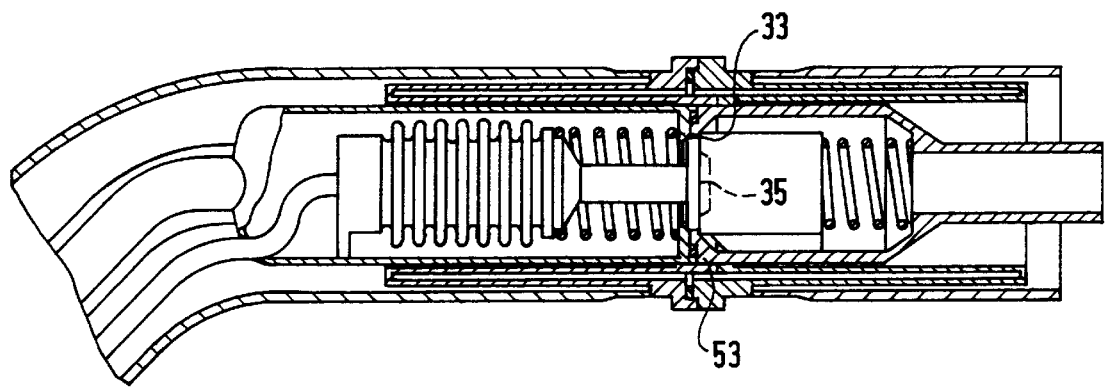
FIG. 3b a schematic longitudinal section of the coupling shown in FIG. 1 with a closed flow path.
Figure 3C:
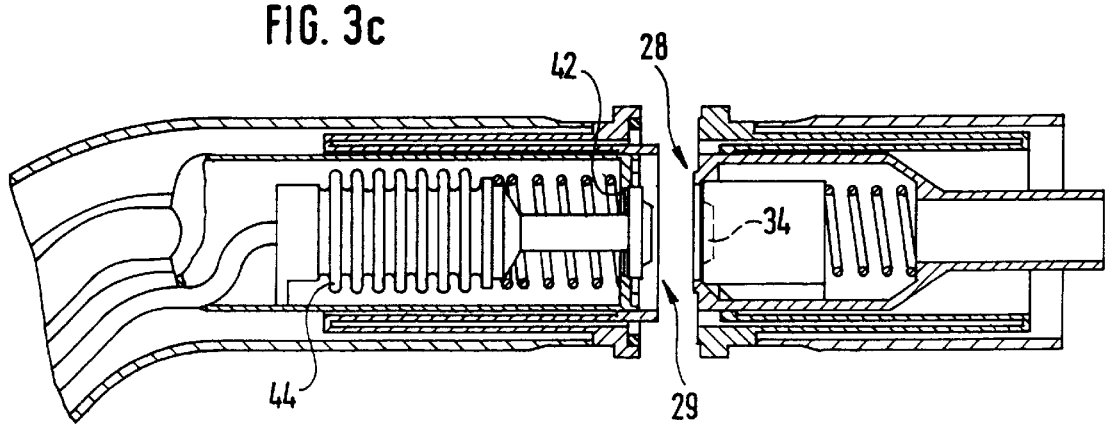
FIG. 3c a schematic longitudinal section of the coupling shown in FIG. 1 with the coupling plug and the coupling socket separated from each other.

Each coupling housing 16, 22 forms an insulating vacuum chamber that extends virtually over the entire length of the coupling plug 10 and the coupling socket 11 to prevent evaporation during the flow of cryogenic media in the line ends 12, 13. The line ends 12, 13 extend all the way to the separation plane 27 of coupling plug 10 and the coupling socket 11. At each line end 12, 13, there are means 28, 29 across from each other (FIG. 3c) and arranged directly adjacent to the separation plane 27 for opening and closing the line ends 12, 13. The means 28 of the coupling socket 11 consist of a closing element 30 that closes the line end 13 and that has a gasket 31 made of PTFE. The closing element 30 is held on the sealing surface 33 by means of a spring 32 and under pressure exerted by the medium (FIG. 3b). The sealing surface is located inside the expanded line end 13 and configured as a wall of the line end 13 tapered at an angle. The closing element 30 with the gasket 31 is pressed by the spring 32 against the sealing surface 33. The closing element 30 has a recess 34 that is designed as a counterpart to a centering element 35 of the coupling plug 10 and that receives this centering element 35 of the coupling plug 10 in an interlocking manner.

The means 29 of the coupling plug 10 for opening and closing the line end 12 is arranged directly adjacent to the separation plane 27 and consists of a control rod 36 that has an open recess 37 facing the coupling side and that has a gasket 38 made of PTFE. The gasket 38 is covered from the top by a flange 39 of the centering element 35. The centering element 35 is connected detachably to the control rod 36 via screw 40 from the free side of the line end 12. The control rod 36 with the gasket 38 is pulled by means of the spring 41 against the sealing surface 42. The sealing surface 42 is provided at the expanded line end 12. The control rod 36 is connected to a control unit 43 configured as bellows 44. The control unit has an internal chamber 45 that is connected via a control line 46 with a pressure chamber (not shown here). The control fluid of the internal chamber is fed into the internal chamber 45 through control line 46 by control means (not shown here).

An element 47, for example, a screw, that limits the stroke of the control rod 36 is screwed into the side of the control rod 36 facing the internal chamber 45 and is limited by a contact surface 48 that is connected to the internal chamber, and the passage opening of the contact surface 48 for the element 47 is smaller than its head 49. The outward stroke of the control rod is limited by the screwed-in length. This prevents damage to the bellows 44 if the bellows 44 is put under control pressure in the uncoupled state.

The expanded line end 12 of the coupling plug is connected via two lines 50, 51, that essentially run concentrically, with a tank (not shown here) containing the cryogenic medium.

As FIGS. 3a and 3b show, the two coupling housings 16, 22 are positioned facing each other in the separation plane 27. Centering rings 52, 53 provided on the faces serve for positional orientation. By pushing down the switch-over lever 15 and the force-boosting mechanism, the coupling plug 10 and the coupling socket 11 are pulled tightly against each other and locked in position; the inner and outer gaskets 24 and 23 are deformed. In this position, which is now sealed to the outside, no flow of the cryogenic medium is possible—the dead volume between coupling plug 10 and coupling socket 11 is not pressurized either since it is minimized by the interlocking of the connection surfaces. By applying the control pressure, the internal chamber 45 of the bellows 44 is pressurized. The bellows moves the control rod holding the gasket 38 perpendicular to the side of the coupling socket beyond the separation plane 27. Consequently, the means 28 of the coupling socket is moved into the open position together with the means 29 of the coupling socket. The two line ends 12, 13 are now connected to each other and the cryogenic medium can flow. After the end of the medium flow, the internal chamber 45 is pressure-relieved via the control line 46. The spring 41 pushes the control rod 36 with the bellows 44 into the closed position until the gasket 38 lies tightly against the sealing surface 33. This process is assisted by the pressures in both line ends 12, 13 since the effective bellows and sealing surfaces generate additional closing forces.

The coupling can now be separated by operating the switch-over lever.

What is claimed is:

1. Coupling for connecting a pair of vacuum-insulated lines via a coupling socket and a coupling plug which are provided for conveying a cryogenic medium, the coupling being in combination with the pair of lines, each of the lines has a line end and closing mean at the line end for closing it, one of the closing means is connected with a control unit that opens the closing means, characterized in that the coupling plug has first closing means which is connected to said control unit and has an internal chamber that is connected to a control line, and the control unit opens the first closing means when exposed to a control pressure applied through the control line into said internal chamber.

2. Coupling according to claim 1, characterized in that the control unit is configured as a bellows, that has an internal chamber that is connected to a control line.

3. Coupling according to claim 1, characterized in that the control unit is arranged in the line end.

4. Coupling according to claim 1, characterized in that the coupling socket and the coupling plug are separated by a separation plane, and that the control unit is connected to a control element of the first closing means and the control unit slides the control element beyond the separation plane, thereby opening the line ends.

5. Coupling according to claim 4, characterized in that the control element has a control rod that is connected to the control unit and that holds a gasket which lies on a sealing surface by means of the force exerted by a biasing element at one line end.

6. Coupling according to claim 5, characterized in that the gasket is pulled against the sealing surface by means of the spring force from outside of the line end.

7. Coupling according to claim 5, characterized in that the control rod has a centering element on its side facing the coupling socket.

8. Coupling according to claim 5, characterized in that the line end is connected to two lines for filling and/or discharging the cryogenic medium.

9. Coupling according to claim 5, characterized in that the face of the line end facing the coupling socket has at least one annular coupling surface and at least one gasket is located on the coupling surface.

10. Coupling according to claim 1, characterized in that the coupling socket has a closing element in the line end, whereby said closing element has a gasket that, by means of the force of a spring element, lies against a sealing surface present at the line end.

11. Coupling according to claim 10, characterized in that the gaskets is pulled against the sealing surface by means of the spring force.

12. Coupling according to claim 10, characterized in that the face of the closing element has a recess to receive the centering element.

13. Coupling according to claim 1, characterized in that the means of both line ends are located directly adjacent to the separation plane of the coupling socket and of the coupling plug.

14. Coupling according to claim 13, characterized in that the gaskets of the means and the gaskets for sealing against the ambient and cryogenic medium are directly adjacent to the separation plane and are detachable.

15. Coupling according to claim 9, characterized in that the connection of the coupling plug with the coupling socket is established via a locking element that is supported on the coupling socket and that pulls the coupling socket against the coupling surfaces whereby the gaskets lie so as to create a tight seal between the coupling surfaces.

16. Coupling according to claim 15, characterized in that the locking element is configured in such a way that it can immediately be detached by an emergency release, preferably immediately after the closing process.

17. Coupling plug as part of a service station pump 1 and coupling socket as a tank closure of a vehicle according to claim 1.

* * * * *